Nov. 27, 1951     E. J. FARKAS     2,576,337
OVERRUNNING SPRAG TYPE CLUTCH

Filed Jan. 25, 1947     2 SHEETS—SHEET 1

E. J. FARKAS
INVENTOR.

ATTORNEYS.

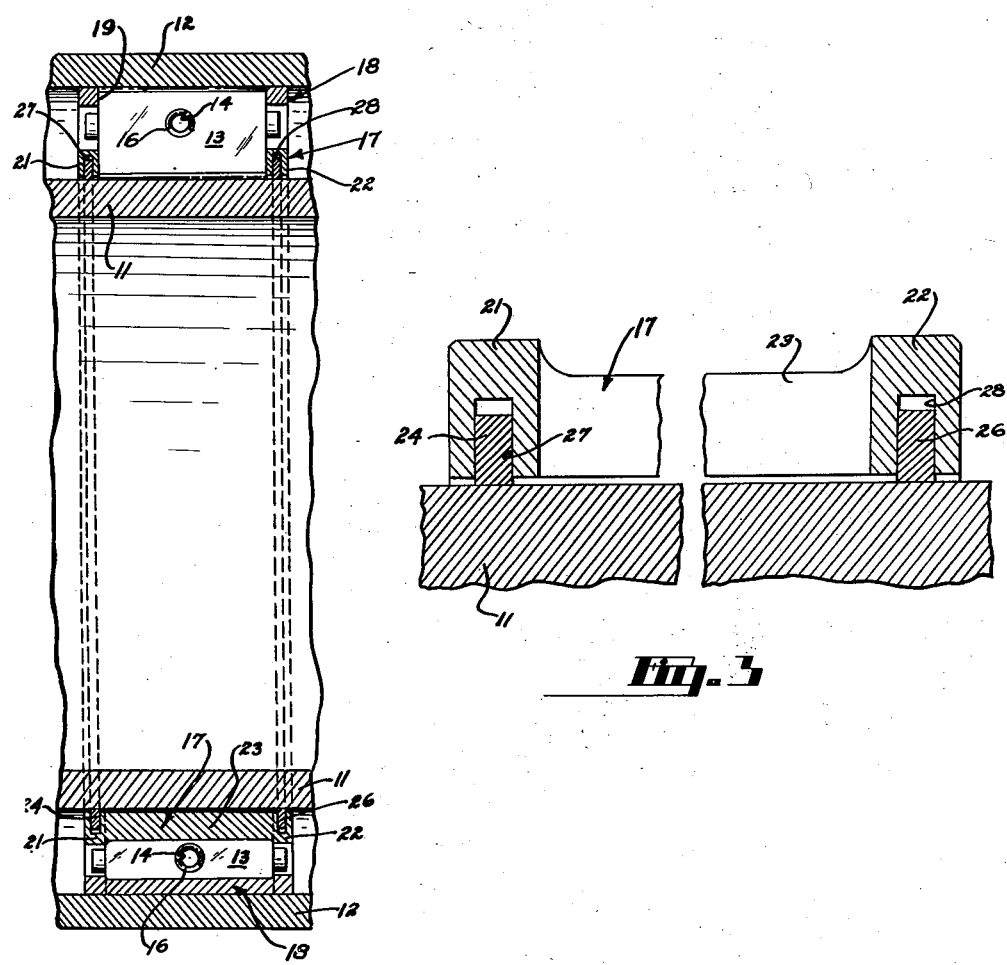

Patented Nov. 27, 1951

2,576,337

UNITED STATES PATENT OFFICE 2,576,337

OVERRUNNING SPRAG TYPE CLUTCH

Eugene J. Farkas, Detroit, Mich., assignor to Ford Motor Company, Dearborn, Mich., a corporation of Delaware Application January 25, 1947, Serial No. 724,347

1 Claim. (Cl. 192—45.1)

This invention relates generally to one-way clutches and more particularly to tiltable gripper type clutches for connecting relatively rotatable races in one relative direction of rotation.

One-way or overrunning clutches of the tiltable gripper type are usually provided with a spring of the garter spring type threaded through holes in the individual grippers to form an annulus, the spring being arranged so as to tend to tilt the grippers in a direction to engage the races. It has been found, however, that additional assistance must be provided to insure positive engagement of the grippers with the races and to enable the grippers to rapidly respond to changes in relative rotation between the races. To accomplish this, inner and outer cages supporting the grippers are usually provided and are arranged to frictionally engage the races to assist in controlling and actuating the grippers. Various means have been proposed for providing this frictional engagement. For example, the races may initially be formed oval shaped so that they will frictionally engage the races when assembled therewith. Other methods include bending the cross members of the cage so as to frictionally engage the adjacent race, and building up certain portions of the cage with frictional material, such as silver solder. The disadvantage of these constructions is that the additional friction which is thus provided is present in both directions of rotation and causes additional power loss during operation of the mechanism. A more serious disadvantage is the likelihood of complete failure of the clutch due to wear of that portion of the clutch cage in constant frictional contact with the adjacent race.

The foregoing disadvantages are overcome by the present construction, which has for one of its principal objects the provision of a one-way clutch incorporating a self-energizing friction element between the clutch cage and the adjacent race. The friction element is initially formed of different diameter than the diameter of the race with which it is to be used so that when assembled the friction element will have a light frictional engagement with the race. This friction is relatively small so that during the relative rotation of the inner and outer races in a direction to disengage the one-way clutch there is little power loss or wear. In the other direction of relative rotation, the friction element functions as a self-wrapping or self-energizing brake band and the frictional retarding force is greatly increased. The tiltable grippers are thus positively controlled and respond rapidly to changes in relative rotation between the races. The present invention thus provides sufficient frictional engagement to actuate the grippers rapidly and accurately in the power transmitting direction of relative rotation, reduces the possibility of failure due to wear of the frictional element, and can readily be incorporated in one-way clutches of the tiltable gripper type with only minor changes in the design of the latter.

Other objects and advantages of the present invention will be made more apparent as this description proceeds, particularly when considered in connection with the accompanying drawing, in which:

Figure 2 is a transverse cross sectional view taken substantially on the plane indicated by the line 2—2 of Figure 1.

Figure 3 is a greatly enlarged fragmentary cross sectional view through the inner cage and inner race, taken substantially on the plane indicated by the line 3—3 of Figure 1.

Figure 1:
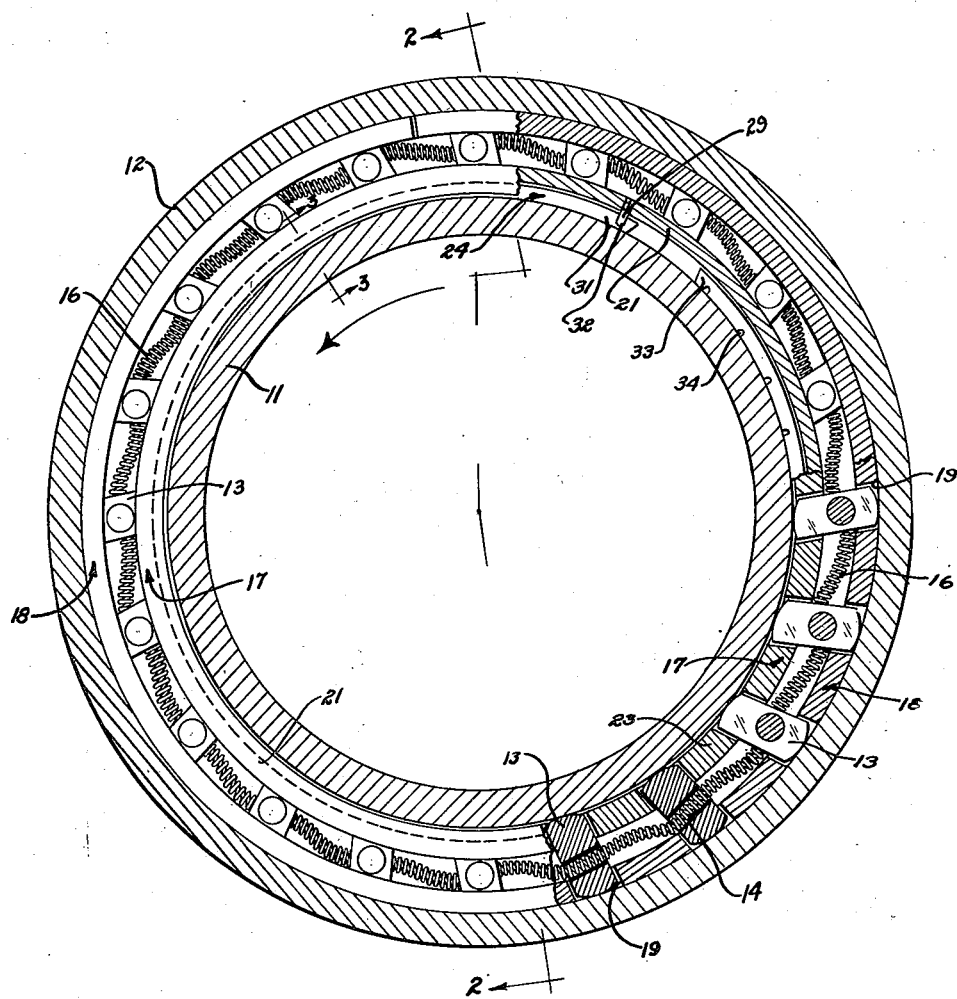
Figure 1 is an end elevation, partly broken away and in section, of a one-way clutch embodying the present invention.

Referring now more particularly to the drawings, the one-way clutch shown is adapted to connect an inner race 11 with an outer race 12. Although the races may be separate members, in many conventional installations of one-way clutches as in automatic transmissions for automotive use, the races are integrally formed in existing parts of the mechanism such as gears, hubs, etc. A series of tiltable grippers 13 are mounted between the coaxial inner and outer races. The sides of the grippers are flat and parallel and the inner and outer ends are arcuate surfaces curved about spaced centers so that when the grippers are tilted counterclockwise as seen in Figure 1, they will disengage the two races and when they are tilted clockwise will engage the two races to transmitted power therebetween.

A central opening 14 is provided in each gripper at an angle other than 90° to the sides of the gripper to receive an annular coil spring 16. The spring 16 is preferably of the garter spring type with its ends connected to form an annulus. The coil spring 16, passing through the oblique opening 14 in the grippers, tends to tilt the grippers in a clockwise direction to engage the races.

To hold the grippers in angularly spaced positions, inner and outer cages 17 and 18 are provided. The outer cage 18 is a split annular ring provided with a series of openings 19 through which the radially outer ends of the grippers extend to frictionally contact the outer race 12. The grippers normally bear against the outer race in response to centrifugal force, and in addition the split outer cage 18 lightly frictionally engages the outer race to assist in tilting the grippers. Centrifugal force, however, works against frictional engagement between the radially inner ends of the grippers and the inner race, and it is advisable to provide additional and more effective means for actuating the inner ends of the grippers.

The inner cage 17 is formed in one piece and constitutes axially spaced rims 21 and 22 joined by circumferentially spaced integral cross members 23. The radially inner ends of the grippers 13 extend through the resulting spaces formed between the cross members 23. It will be apparent that actuation of the inner cage 17 in either direction will be effective to tilt the grippers in the corresponding direction by engagement of the inner ends of the grippers by cross members 23.

The inner cage 17 is freely rotatably mounted upon the inner race 11, a clearance of a few thousandths being provided therebetween. Controlled frictional engagement between the inner race 11 and the inner cage 17 is provided, however, by a pair of metallic friction bands 24 and 26. The bands are generally rectangular in cross section, with their maximum cross sectional dimension being in a radial direction. The inner surface of the band is preferably copper plated to reduce wear caused by frictional engagement between the bands and the inner race. The friction bands 24 and 26 are respectively mounted in circumferentially extending grooves 27 and 28, formed in the rims 21 and 22 of the inner cage and opening radially inwardly. An anchor member 29, in the form of a pin having a rounded head and a square shank, is provided for each friction band with the square shank mounted in a hole in the rim and the round end projecting into the groove formed in the rim. As best seen in Figure 1, the end 31 of each friction band is provided with a slot or notch 32 for engagement with the anchor pin 29. The remaining portion of each band is freely slidably mounted in its corresponding groove and terminates in a free end 33 spaced circumferentially a slight distance from the anchored end 31 of the band.

In its unstressed or free position before assembly, each friction band is somewhat smaller in inside diameter than the outside diameter of the inner race 11. It is therefore necessary to slightly expand the band to assemble the clutch upon the inner race, the result being that the band is slightly distorted and is in light frictional contact with the inner race at all times. Having one end anchored and the opposite end free, each band is of the self-wrapping or self-energizing type. In other words, when the inner race 11 rotates in a counterclockwise direction as indicated by the arrow in Figure 1, the friction of that portion of the band between the anchored end 31 and the free end 33 helps to apply the band to the drum and to increase its retarding effect. Conversely, when the inner race rotates in the opposite or clockwise direction, the bands tend to unwrap and the frictional force is correspondingly much less. It has been found that in a construction of this type the frictional force in the wrapping direction may be as much as three or more times as great as the frictional force in the unwrapping direction. With these characteristics, the frictional bands admirably lend themselves to a precise and lasting control of the tiltable grippers.

In the counterclockwise or power transmitting direction of rotation of the inner race relative to the outer race, the self-wrapping effect of the friction band provides a sufficient frictional drag between the inner race 11 and the inner cage 17 to assist in tilting the grippers in a clockwise direction to thus effectively and rapidly lock the inner and outer races together. In the clockwise or overrunning direction of rotation of the inner race relative to the outer race, the frictional drag between the friction band and the inner race is materially smaller, as pointed out above, and while sufficient to assist in tilting the grippers in a counterclockwise direction to release them is insufficient to cause material wear of the friction band. The mechanism thus has an exceptionally long life and should operate for the life of a transmission without failure.

Axially extending grooves 34 are formed at spaced intervals in the frictional surface of the friction band 24 near its free or unanchored end 33. These grooves function to remove surface oil from the inner race 11 and increase the braking force therebetween.

Although one specific embodiment of the invention has been shown, it will be understood that other arrangements are possible and are contemplated, within the spirit and scope of the appended claim. For example, if desired, a smaller or greater number of friction bands might be used and they might be anchored to the race rather than to the cage. In addition, similar frictional elements could be used between the outer race and the outer cage, while in some instances it might be possible to eliminate the outer cage entirely. These, as well as other variations, are contemplated by the invention.

What is claimed is:

A one way clutch for connecting inner and outer coaxial races comprising a plurality of tiltable grippers interposed between the races, radially spaced inner and outer cages each having a pair of axially spaced annular side rims integrally interconnected by a plurality of circumferentially spaced cross members holding the grippers in spaced relationship, the internal diameter of the side rims of said inner cage being slightly greater than the external diameter of said inner race to provide a slight clearance therebetween, each side rim of said inner cage having an annular groove formed therein with the grooves being rectangular in cross section and opening only into the radially inner surface of said rims to face said inner race, each of said grooves having a greater radial dimension than its axial dimension, an annular metallic band of rectangular cross section received within each of the grooves in said inner cage, each band having an axial dimension corresponding to the axial dimension of said grooves and slidably contained therein and a radial dimension slightly less than the radial dimension of said grooves to provide clearance in the bottom of said grooves when the bands are seated therein, each band consisting of a single convolution extending slightly less than 360° in circumference and in its free position having an internal diameter slightly smaller than the external diameter of said inner race so that when the cages and bands are assembled over the inner race the bands lightly engage the inner race throughout their entire circumferential extent, and anchoring means within each of said grooves anchoring one end of each of said bands to said inner cage so that in one direction of rotation each single convolution band is expanded away from said inner race into the clearance space provided in the bottom of the groove and in the opposite direction of rotation is wound into tighter functional contact with the inner race to energize said inner cage and apply a rotating force to said grippers tending to rotate each of the grippers about its own axis into locking engagement with the inner and outer races.

EUGENE J. FARKAS.

REFERENCES CITED

The following references are of record in the file of this patent:

UNITED STATES PATENTS

| Number | Name | Date |
| --- | --- | --- |
| 677,872 | Locke | July 9, 1901 |
| 953,308 | Waite | Mar. 2, 1910 |
| 1,425,900 | Rundell | Aug. 15, 1922 |
| 1,952,415 | Brownlee | May 27, 1934 |
| 1,964,310 | Bethenod | June 26, 1934 |
| 2,044,420 | Collyear | June 16, 1936 |
| 2,366,843 | Dodge et al. | Jan. 9, 1945 |
| 2,386,013 | Swenson | Oct. 2, 1945 |
| 2,389,961 | Dodge | Nov. 27, 1945 |
| 2,399,749 | Lund | May 7, 1946 |
| 2,503,350 | Nardone | Apr. 11, 1950 |